Figure 1:
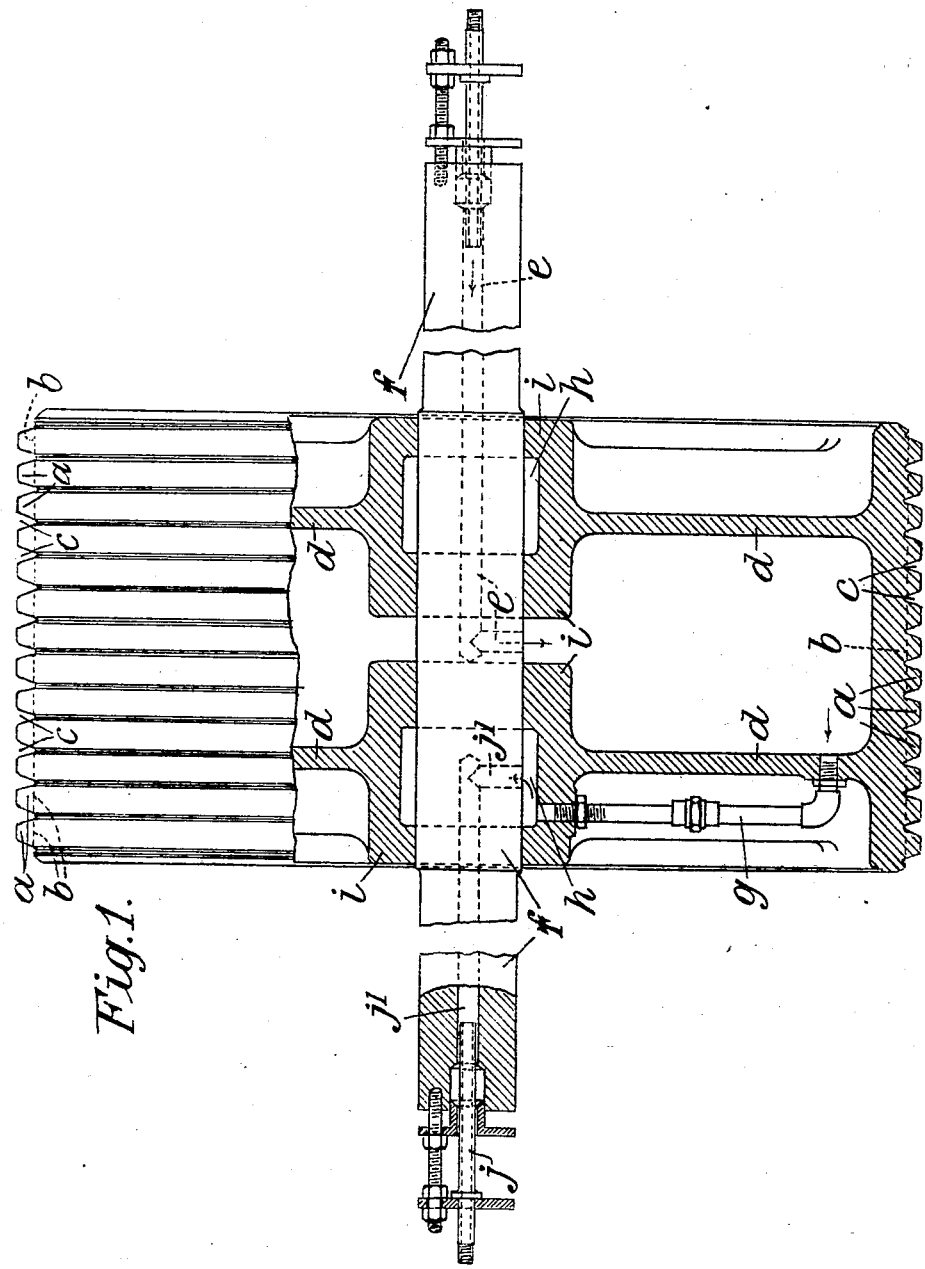

E. EVANS.
MACHINERY FOR THE MANUFACTURE OF FEEDING CAKE.
APPLICATION FILED MAY 19, 1910.

969,049.

Patented Aug. 30, 1910.

2 SHEETS—SHEET 1.

Witnesses
Jos. A. Ryan

Inventor
E. Evans
by
Attorney

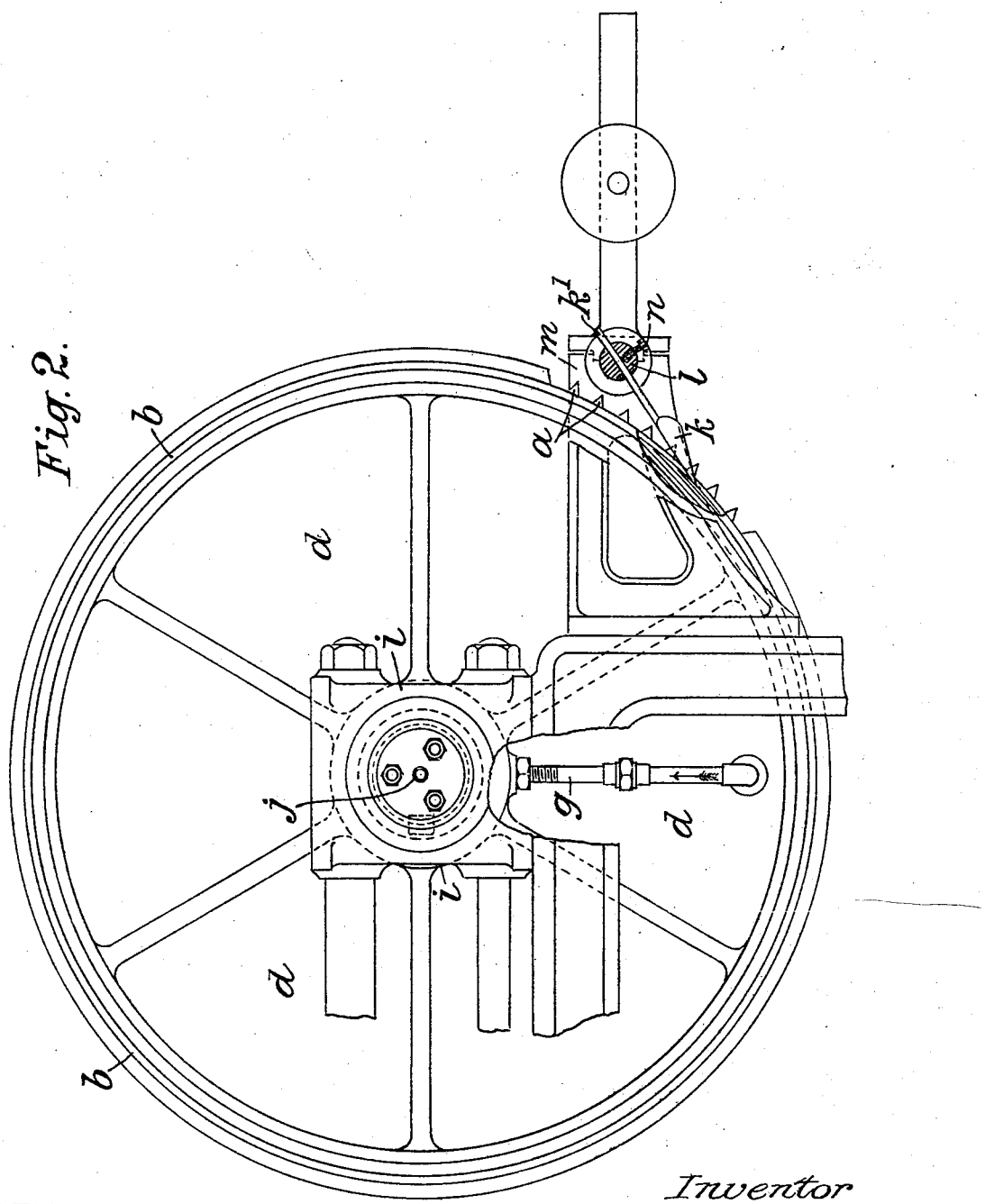

UNITED STATES PATENT OFFICE.

ERNEST EVANS, OF LISCARD, ENGLAND.

MACHINERY FOR THE MANUFACTURE OF FEEDING-CAKE.

969,049.  Specification of Letters Patent.  Patented Aug. 30, 1910.

Application filed May 19, 1910. Serial No. 562,248.

*To all whom it may concern:*

Be it known that I, ERNEST EVANS, a subject of the King of England, residing at Liscard, in the county of Chester, England, have invented new and useful Improvements in or Connected with Machinery for the Manufacture of Feeding-Cake, of which the following is a specification.

This invention has reference more particularly to the manufacture of feeding cake for animals which is made in continuous or rotary machinery, and produced in the form of divided, indented, or equivalently formed cake, which can be easily divided or broken into small pieces at the points of the partial division, indentation, or the like, or which is produced in such pieces, of definite shape and size; and the chief object of the present invention is to provide improvements in connection with such manufacture and machinery, by which the actual performance and manufacture by and in the machine can be better effected or carried out.

In the following description, the improvements hereunder are comprised. The continuous machinery for the manufacture of feeding cake of the character referred to, is of the kind in which the meal or material to be formed into cake is introduced into a space between two moving surfaces, with special formations upon same, by which it— the meal—is divided up into sections or divisions in the manner referred to; and, preferably, these moving surfaces consist of two drums or wheels of relatively large diameter, disposed closely to each other, one having a plurality of peripheral or circumferential projecting parts or ribs upon it, while the other has projecting parts or ribs on its surface parallel with its axis, and with gaps in same, into which the other circumferential projecting parts or ribs enter or run, as the two drums revolve in opposite directions. The surfaces of these drums or wheels are dried continuously by artificially heating them, as by making them hollow, and introducing steam or heating fluid into them, or circulating it through them; or by applying heat, as by gas heat, or heat produced by the combustion of any suitable fuel, which is applied to their exterior or interior surface, or by equivalent means; the effect of which is that the sticking of the meal to the surfaces of the drums, wheels, or either of them, which is liable sometimes to take place in machines as hitherto made, is completely prevented; and hence stoppages for the purpose of cleaning the drums or wheels are obviated, and the machine generally rendered more efficient.

The removal of the cake, or divided portions or pieces of cake, from the spaces or matrices in which they are pressed, is effected by a comb device consisting of thin devices with an inclined end facing the direction in which the cake is moved, and placed so that their inner edges lie on or next the face of the said drum or wheel, and in the bottom of the gaps in the parallel projecting part or ribs referred to, so that as the wheels revolve, and the cake made comes in contact with the leading point of the teeth of this comb device, the cake is raised from the surface of the drum, and so ejected or removed.

The above improvements are illustrated in the annexed drawings, in which—

Figure 1 is a drum or wheel of the character referred to, shown in cross section, while Fig. 2 is a side elevation showing this wheel, and the comb device for removing the cake from the spaces in which it is made.

In the mode illustrated of drying the surfaces of the drum consists in heating it internally by the heat of a fluid say steam; the form of drum or wheel shown being that wherein there are rows of wedge-shaped teeth or projections with gaps between them, extending in parallel transversely to the periphery proper of the drum; and in connection with this drum or wheel another drum or wheel works, which will have peripheral annular wedge-shaped ridges on its periphery, which in working, lie and revolve within the gaps between the teeth or projections of this wheel, the edges of such peripheral ridges or projections coming up to or nearly up to the periphery proper of the aforesaid first drum or wheel.

In the drum shown $a$ are the teeth running transversely of the periphery proper $b$ of the wheel; and $c$ represent the gaps or spaces—which are also wedge-shape—in each of the rows of transverse projections or teeth $a$.

The wheel is constructed to receive and hold the heating fluid—say steam, by being provided with known form of means, such as closed webs $d$ at each side, forming the interior of the wheel into a chamber, and providing a conduit $e$ in the shaft $f$ for the introduction of steam into this chamber.

The steam, or water of condensation, escapes from the chamber by pipes $g$, the outer ends of which are disposed near the outer part of the chamber, and the inner ends of which communicate with an annular space $h$ in the hub $i$ of the drum, which communicates with a discharge pipe $j$ through a passage $j^1$ in the shaft.

It will be seen that by the introduction of heating fluid in the drum or wheel as described, the heat will be conducted to the periphery $b$ of the drum, and the projections or teeth $a$; and the surfaces of these will be kept warm and dry, with the effect that the sticking of the meal, of which the cakes are formed, to these surfaces is completely prevented.

With regard to the cake removing device as illustrated in the drawings, the comb is made up of a plurality of parallel thin metal devices $k$, the ends of which are inclined, and face the direction in which the drum is revolving; and these ends lie or come next the periphery $b$ at points between the teeth $a$, that is, in the bottom of the gaps $c$. In some cases, the drum periphery or face proper $b$ has shallow grooves formed in it at the bottom of these gaps in which the points or ends of the devices $k$ lie.

The several parallel devices $k$—of which there will be the same number as there are gaps $c$—are carried by a transverse shaft $l$, supported by brackets $m$ from the frame of the machine; they being fitted and secured in this shaft, by their shanks $k^1$ being passed through holes in it; and they are adjusted and fixed in the required position by means of the clamping stud bolts $n$, which screw through the shaft $l$ onto the shanks $k^1$.

The comb device will be placed in such a position on the drum or wheel—say just above the lower level of the wheel—that as the cakes are removed, they will fall directly in strips or lengths onto a conveyer disposed and running under the drum, and be conveyed thereby away, and dealt with as desired. Or, in some cases, where desired, they may be discharged directly into a receptacle or surface.

What is claimed is:—

1. In an apparatus of the class described, the combination of a drum provided on its periphery with ribs and grooves, said drum being hollow to form a heating chamber, a shaft supporting said hollow drum and having a passage which communicates with the chamber and the atmosphere for the introduction of a heating agent, an exit pipe connected with the chamber and communicating with a sub chamber formed in the hub of the hollow drum, said sub chamber communicating with an exit passage formed in the shaft.

2. In an apparatus of the class described, the combination of a shaft formed with inlet and outlet passages, a hollow drum supported on the shaft and having a sub chamber adjacent the inner open end of the exit passage, the inner open end of the inlet passage communicating with the interior of the hollow drum, an exit passage formed between the hollow drum and the sub chamber, a plurality of ribs and grooves formed on the periphery of the drum, a plurality of teeth engaging the grooves below the plane of the center of the drum, an adjustable cross bar formed with openings in which the shanks of the teeth fit and means for securing the teeth in the cross bar.

In testimony whereof I have signed my name to this specification in the presence of two subscribing witnesses.

ERNEST EVANS.

Witnesses:
SOMERVILLE GOODALL,
WILLIAM F. PARRY.